No. 793,186. Patented June 27, 1905

UNITED STATES PATENT OFFICE.

GUSTAVE GIN, OF PARIS, FRANCE.

PROCESS OF EXTRACTING COPPER FROM ITS ORES.

SPECIFICATION forming part of Letters Patent No. 793,186, dated June 27, 1905.

Application filed July 26, 1902. Renewed November 22, 1904. Serial No. 233,889.

*To all whom it may concern:*

Be it known that I, GUSTAVE GIN, a citizen of the French Republic, and a resident of Paris, France, have invented a certain Novel Process for the Extraction of Copper from its Sulfureted Ores, of which the following is a specification.

The solution of sulfurous acid possesses the known property of attacking the oxid and the carbonate of copper to form an instable sulfite of bioxid, which is slowly changed into a mixture of cuprosocupric sulfite and sulfate according to reactions (1) $3CuO + 3SO_2 = 3SO_3Cu.$ (2) $3SO_3Cu + CuO = SO_3Cu_2SO_3Cu + SO_4Cu.$
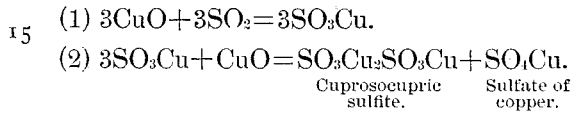

The cuprosocupric sulfite is hardly soluble in water, but very soluble in solutions of sulfurous acid or copper sulfate.

By heating the solution to 180° (under pressure of ten K) it loses sulfurous acid, while there is formed copper sulfate and metallic copper (3) $(SO_3Cu_2 + SO_3Cu) = 2Cu + SO_4Cu + SO_2.$ If the equations 1, 2, and 3 be taken together, it will be seen that the totality of the reactions corresponds to $$4CuO + 2SO_2 = 2Cu + 2SO_4Cu,$$

that is to say, one half of the copper can be obtained in the metallic state and the other half in the form of sulfate.

I have based on the principles just explained a process which utilizes for the treatment of copper ores the sulfurous acid resulting from their roasting in such fashion that the reactive agent may be completely extracted from the ore itself and from the atmosphere. The ore is roasted in such fashion that all the sulfid of copper will be changed into bioxid or sulfate and all the iron into peroxid. It is then submitted to methodical lixiviation by means of a solution of sulfurous acid prepared in the usual way. A saturated solution of cuprosocupric sulfite and of copper sulfate is obtained containing at the same time a certain proportion of sulfite and sulfate of iron protoxid. In fact, the sulfite of sesquioxid of iron is transformed in the contact of an excess of sulfurous acid according to the reaction $$SO_2, Fe_2O_3 + SO_2 = SO_4Fe + SO_3Fe.$$

The saturated solution of the copper and iron salts is collected by means of a pump in a copper boiler, where it is delivered at a temperature of 180°, (which supposes a pressure of about ten K). At this temperature the iron sulfite and sulfate are quite insoluble and precipitate. As to the cuprosocupric sulfite, it is decomposed and abandons two-thirds of its copper in the metallic state at the same time that copper sulfate is formed. The turbid liquid is then injected under its own pressure into a filter-press heated by the vapor circulating in the plates, an apparatus which I have before patented for the mechanical separation of copper sulfates and sulfates of protoxid of iron and which could be replaced by any other arrangement permitting the filtration of liquids at high temperature. A solution of sulfate of copper is thus obtained which may be cementated or treated for crystallized sulfate and a precipitate containing metallic copper, sulfite, and sulfate of protoxid. This precipitate is washed with pure water which saturates itself with the sulfate of protoxid of iron, which can be extracted by crystallization. The residual sulfite is afterward oxidized by damp air and gives sulfate of protoxid, which is eliminated by a fresh washing, and there remains finally metallic copper of great purity, which is melted and cast in lingots.

Having now fully described my invention, what I claim, and desire to secure by Letters Patent, is—

The herein-described process of treating copper ore containing iron, consisting in roasting the ore, lixiviating the roasted ore with a solution of sulfurous acid, heating the resulting solution to a temperature sufficiently high to precipitate the iron sulfite and sulfate and decompose the cuprosocupric sulfite contained in the solution, then filtering the solution, washing the precipitate with water, permitting oxidation of the residual sulfite to form sulfate of iron, and then rewashing said residue to remove such iron sulfate.

In testimony whereof I have hereunto set my hand in presence of two witnesses.

GUSTAVE GIN.

Witnesses:
ADOLPHE STURM,
EDWARD P. MACLEAN.